July 6, 1965　　　　　　HENRY H. WU　　　　　　3,193,762
WHEATSTONE BRIDGE APPARATUS FOR MEASURING THE IMPEDANCE OF
TRANSDUCERS, WHICH VARIES AS A FUNCTION OF APPLIED STRAIN
Filed Sept. 23, 1960　　　　　　　　　　　　　2 Sheets-Sheet 1

INVENTOR.
HENRY H. WU
BY
ATTORNEY

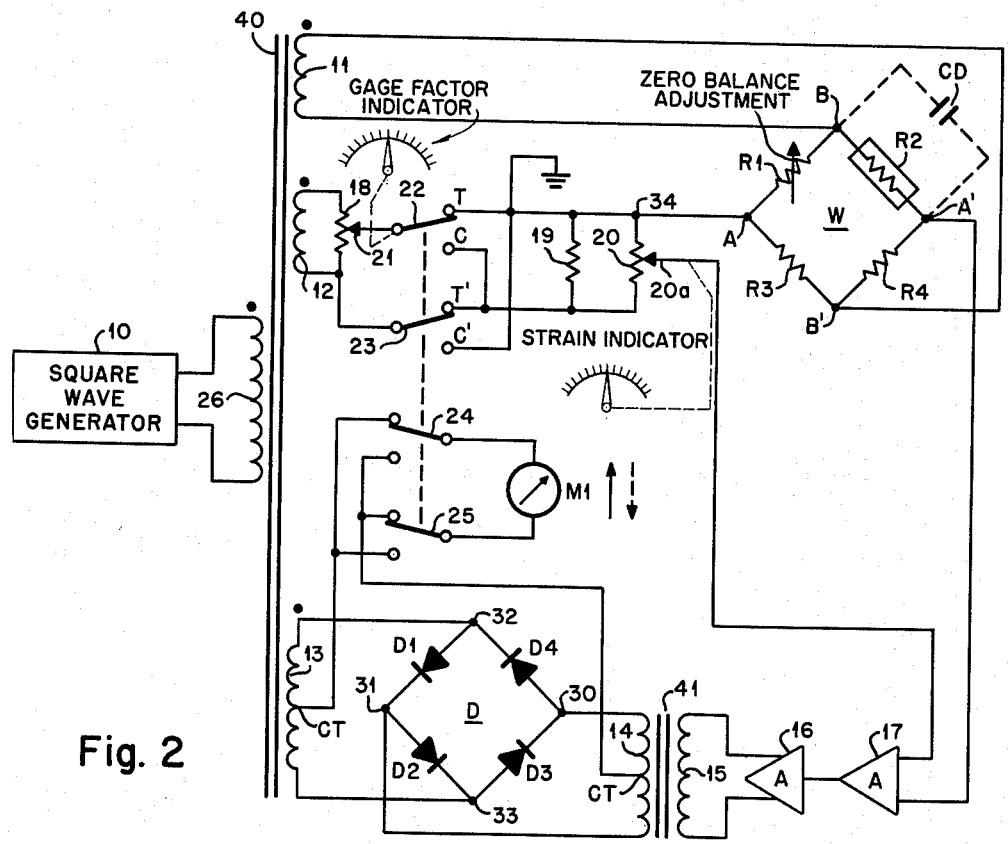
Fig. 2
| | SINE WAVE | | SQUARE WAVE | |
|---|---|---|---|---|
| 2A-1 | 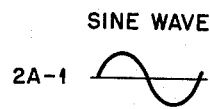 | COMPARISON $E_{20a-34}$ | 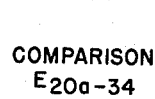 | 2B-1 |
| 2A-2 |  | OUTPUT $E_{A-A'}$ |  | 2B-2 |
| 2A-3 |  | RESIDUAL $E_{20a-34}+E_{AA'}$ | 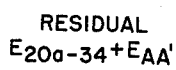 | 2B-3 |
Fig. 2A     Fig. 2B
INVENTOR.
HENRY H. WU
BY
ATTORNEY

United States Patent Office 3,193,762
Patented July 6, 1965

3,193,762
WHEATSTONE BRIDGE APPARATUS FOR MEASURING THE IMPEDANCE OF TRANSDUCERS, WHICH VARIES AS A FUNCTION OF APPLIED STRAIN
Henry H. Wu, Chicago, Ill., assignor, by mesne assignments, to Strainsert Company, Bryn Mawr, Pa., a corporation of Pennsylvania
Filed Sept. 23, 1960, Ser. No. 58,015
6 Claims. (Cl. 324—62)

This invention relates to an improved strain gage instrument and to an improved instrumentation method for resistive transducers. More particularly this invention relates to an improved bridge circuit as well as other elements used in a strain gage instrument, wherein the bridge circuit and the associated measuring and balancing ciricuits thereof are driven from a source of electrical potential producing repetitive symmetrical rectangular (commonly called "square") voltage wave forms.

As is well known, strain gage instruments are devices for measuring dynamic or static forces. These devices generally include in some form an electrical circuit known as a Wheatstone bridge which comprises a plurality of resistive elements. When the bridge circuit is so employed, one or more of the resistive components thereof takes the form of a resistive transducer element, the impedance of which varies as a function of the applied strain. Schematically the bridge circuit appears as a rhombus or diamond, wherein each leg of the rhombus comprises either a resistor or a resistive transducer element. The driving voltage, usually sinusoidal, is applied to a first pair of terminals which are at opposite ends of the rhombus, while outputs from the bridge are taken from terminals at the two remaining corners of the four sided figure.

In operation when the resistive components of the bridge are balanced, the output of the bridge circuit should be zero; however, as a practical matter, it is extremely difficult to achieve balance between the elements of the bridge so as to obtain a zero output. This is true because all the elements thereof are not purely resistive, and have associated therewith certain amounts of distributed capacitance plus additional capacitance associated with the leads to the resistive elements. Thus, even after the bridge is resistively balanced, a troublesome residual voltage appears at the output terminals of the bridge due to the capacitive unbalance therein.

It is well recognized that the signal produced from a Wheatstone bridge in response to a change in resistance of a strain sensitive element therein is relatively small; hence amplifying elements used to detect such signals must be very sensitive. Oftimes it occurs that the residual voltage appearing after the resistive elements of the bridge are balanced is large enough to drive the amplifier connected to the bridge toward saturation rendering it insensitive or less sensitive to signal voltage fluctuations produced in response to changes in resistance of the resistive transducer element.

The additional capacitance just described, of course, represents additional impedance in the form of capacitive reactance tending to unbalance the bridge even when all the resistances therein are properly set. In the prior art, this additional capacitance is balanced out by adjusting a compensating variable capacitor connected in circuit with the bridge, so as to achieve an output approaching zero when the bridge is resistively balanced. However, this mode of balancing out the additional capacity suffers from the disadvantage that adjusting the compensating capacitor can be quite time consuming and requires additional components and circuitry.

The various problems just described relating to capacitive unbalance in a Wheatstone bridge circuit may be obviated by using the technique and apparatus described herein. As pointed out previously, a sine wave generator is normally employed to drive the bridge. Hence, any residual voltage produced at the output of the bridge after resistive balance is obtained will be sinusoidal in form. In the apparatus disclosed herein a square wave generator is used to drive the bridge circuit, and as shall be explained, any capacitive unbalance causes only a spike of voltage to be produced in synchronism with the leading and trailing edges of the applied waveform. The residual voltage is then in the form of a spike of short duration in comparison to the period of the driving voltage, and hence its effect on circuits following the bridge will be negligible.

While the use of this square wave driver for the bridge circuit herein disclosed has many applications, it is particularly useful when employed in my novel strain gage indicator arrangement.

One other application of this new and improved circuit rests in the use of a servo motor system having two windings, wherein one of these windings is driven from the voltage source producing square waves, and the other winding thereof is driven through a suitable power amplifier by the output of the aforementioned bridge circuit. The rotor of the servo motor is connected by a suitable mechanical linkage to the movable arm of a potentiometer which controls the drive to the aforementioned power amplifier, and thus the voltage produced by this potentiometer could null the effect of any output of the bridge circuit. As shall be seen, the setting of the potentiometer (as noted by any convenient scale) is an indication of the unbalance detected by the bridge circuit. Accordingly, the applied signal indicative of the unbalance detected is used to automatically give an indication of the strain applied to the sensitive element of the bridge.

Thus it is an object of this invention to provide new and useful improvements in a strain gage instrument.

Another object of this invention is to provide new and useful improvements in an instrumentation method for certain resistive transducers.

It is a further object of this invention to provide an improved bridge circuit and apparatus to be used with resistive transducers.

Another object of this invention is to provide a more sensitive strain gage instrument.

Yet another object of this invention is to provide a bridge circuit wherein the effect of the capacitance associated with the elements and the leads thereof is minimized.

Yet another object of this invention is to provide a new and improved electrical apparatus.

Other objects and advantages of this invention will readily be appreciated by those skilled in the art as the remainder of this specification is read in conjunction with the following drawings in which:

FIGURE 2 shows a diagram of a strain gage indicator employing the principles of the invention;

FIGURES 2A and 2B illustrate the various wave forms associated with the apparatus of FIGURE 2, and;

Figure 1:
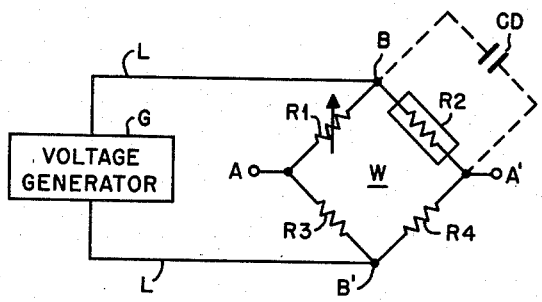
FIGURE 1 shows a schematic of a Wheatstone bridge being driven by a square wave voltage generator.

Referring now to FIGURE 1, there is shown the basic circuit used in this invention in which a Wheatstone bridge W is excited by a voltage generator G which produces a square wave voltage train ESQ (FIG. 1A) having positive and negative excursions. The output of generator G is applied to terminals B and B¹ at diametrically opposed points of bridge W, which comprises four resistive elements R1, R2, R3 and R4, wherein resistors R1 and R3, and resistors R2 and R4 are connected in series legs between terminals B and B¹. Any one, or more of the resistors R1, R3, or R4 may be variable, but only resistor R1 is shown as such. Resistive element R2 represents a resistive transducer element, the resistance of which changes as it is subjected to an appropriate physical phenomenon. The outputs from the bridge circuit are obtained across terminals A and A¹ which are also at diametrically opposed points in the bridge circuit W, namely at the junction of resistors R1 and R3, and at the junction of elements R2 and R4 respectively.

The operation of the bridge circuit W is well known, and suffice it to say if the condition $R1/R3=R2/R4$ is met (and neglecting any other incidental impedances in the circuit) that no output will be obtained across terminals A and A¹ and the bridge will be in a balanced condition. Further, it will be appreciated if the resistive transducer element R2 increases in value due to an applied physical phenomenon that the potential at point A will increase with respect to point A¹ when the voltage from generator G is positive going (i.e. terminal B is positive with respect to B¹), and if the value of resistive transducer element R2 decreases, then the potential at point A will decrease with respect to point A¹ when the voltage from generator G is positive going. Accordingly, and without further explanation, it will be understood that the phase of the output voltage appearing at terminals A and A¹ of bridge W compared with the applied voltage is dependent upon whether the resistive transducer R2 increases or decreases in value after the bridge is once balanced.

Assuming the resistive elements R1 through R4 of the bridge W are balanced, then the voltage at terminals A and A¹ should be zero. As a practical matter however, electrically the bridge W includes a distributed capacitance inherent in resistors R1 through R4. It is quite often the case that physically, resistive transducer element R2 is removed some distance from the rest of the elements of the bridge. This aforementioned condition would occur where the work being tested is remote from the testing instrument, which includes the rest of the elements of bridge W. Accordingly, an additional amount of capacitance would be added to the bridge circuit, the amount of which would be dependent on the length of the leads connecting the resistive transducer element to the remainder of the bridge. For the purposes of this explanation, all of the various additional capacitances have been lumped together and are represented (in the figures) in dotted lines by the capacitor CD.

Unless an additional variable capacitor is added to the bridge circuit W to balance out the effect of capacitance CD, the circuit shown can never be truly balanced so that no output voltage appears between terminals A and A¹. In conventional modes of operation, the resistively balanced bridge W is driven by a sinusoidal voltage generator producing an output of the type shown in the first line of FIGURE 1A. With this type of driving voltage, it will be appreciated that even after the most judicious effort in balancing the resistance in the bridge W is made, a residual voltage (waveform ERS in FIG. 1A) will appear across the terminals A and A¹. The amplitude of residual voltage ERS will be a function of the unbalance created by capacity CD and may be large enough to drive an amplifier into saturation or otherwise introduce an error into a measuring system.

Figure 1A:
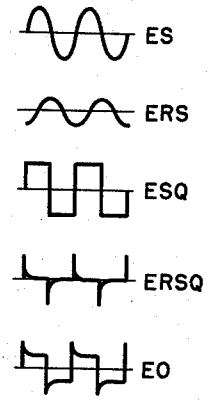
FIGURE 1A shows idealized wave forms at the output terminals for the bridge circuit of FIGURE 1 when the bridge circuit is driven by a square wave or a sine wave voltage generator.

To obviate the problem just described, a voltage generator G is provided producing wave forms having steep leading and trailing edges as shown in waveform ESQ of FIGURE 1A. Now when the bridge W is resistively balanced, the capacitive unbalance will cause negative and positive spikes of voltage to appear at terminals A and A¹ (as shown in waveform ERSQ) in coincidence with the leading and trailing edges of the applied voltage ESQ. The duration of each of the spikes of wave form ERSQ will be small in comparison to the period of the square wave ESQ, and thus the spikes of voltage will have very little effect on an amplifier which ordinarily would be connected to the output of the bridge W. The waveform EO in FIGURE 1A shows the outputs from bridge W when the resistance of element R2 changes and the generator G connected thereto produces rectangular voltage wave forms.

Referring now to FIGURE 2, there is shown a strain gage measuring device comprising a bridge of the type shown in FIGURE 1. The strain gage measuring device comprises a square wave generator 10 coupled to the primary winding 26 of transformer 40. Transformer 40 has three secondary windings 11, 12 and 13 associated therewith and it will be observed that the secondary winding 11 is connected to terminals B and B¹ of bridge W. Consequently, it will be understood that bridge W is driven in the same manner as described previously, and that outputs therefrom are obtained, in phase or 180° out of phase with the driving voltage, across terminals A and A¹ depending upon whether the strain sensitive element R2 increases or decreases in resistance in response to applied tension or compression.

Secondary winding 12 is connected across a potentiometer 18 having a moveable contact 21 which is in turn connected to the moveable arm of the switch 22. One end of winding 12 and potentiometer 18 are connected to the moveable arm of another switch 23 which is ganged to switch 22. As shown on FIGURE 2, the moveable arms of switches 22 and 23 are connected to terminals T and T¹ respectively, hence current induced in secondary winding 12 will pass through potentiometer 18 and from moveable contact 21 thereof through switch 22, contact T to one end of a parallel circuit comprising resistor 19 and potentiometer 20. The remaining end of the parallel circuit comprising elements 19 and 20 is connected via contact T¹ of switch 23 back to potentiometer 18 and secondary winding 12. The setting of moveable contact 21 determines the amount of current passing through elements 19 and 20, and this setting may be changed as the sensitivity requirements of the strain measuring device dictate.

The dots adjacent to the various windings 26, 11, 12 and 13 of transformer 40 indicate in the conventional manner the phase relationships of the voltage in primary winding 26 to that induced in the various secondary windings 11, 12 and 13. An examination of the switches 22 and 23 will show that when the moveable arms thereof engage contact C and C¹ respectively (instead of T and T¹ as shown) that the phase of the voltage across the parallel circuits comprising elements 19 and 20 will reverse.

The output of bridge W appearing across terminals A and A¹ is coupled to an amplifier 17 which may include, for example, a transistor or a vacuum tube. If a transistor amplifier is used, the output of terminals A and A¹ of bridge W may well be connected to the base and emitter thereof, or in the case of a vacuum tube, terminals A and A¹ may be connected to the cathode and to a control electrode thereof. As FIGURE 2 illustrates, terminal A¹ is connected in a straight forward manner to one of the input terminals of amplifier 17. The remaining output terminal A is connected to another input terminal of amplifier 17 through potentiometer 20 and the moveable arm 20a thereof.

The output of amplifier 17 is connected to the input of another amplifier 16, the output of which in turn drives primary winding 15 of transformer 41. The secondary winding 14 of transformer 41 has a center tap terminal CT¹. This secondary winding 14 is connected to a ring-type demodulator D comprising four diodes D1, D2, D3 and D4, wherein the cathodes of each of the diodes D1 to D4 are connected to the anodes of adjacent diodes in the ring. The upper terminal of winding 14 of transformer 41 is connected to the junction 30 of the cathode and anode of diodes D3 and D4 respectively, and the lower terminal of winding 14 is connected to the junction 31 of the cathode and anode of diodes D1 and D2. Additionally, the ring demodulator D is connected to the upper end of secondary winding 13 of transformer 40 at the junction 32 of the anode of diode D1 and the cathode of diode D4, and to the other end of winding 13 at the junction 33 of the anode of diode D3 and the cathode of diode D2. Secondary winding 13 includes a center tap terminal CT, and as may be observed from FIGURE 2, a meter M1 is connected through a pair of switches 24 and 25 between the center taps CT and CT$^1$ of winding 13 and 14. Switches 24 and 25 are ganged with switches 22 and 23 and operate so as to reverse the connections of meter M1 with respect to center tap points CT and CT$^1$.

The ring demodulator D is a full-wave synchronous phase-sensitive detector. It is used, in this specific application to obtain a D.-C. current proportional to the magnitude of the signal voltage applied through winding 14 wherein the direction of this D.-C. current is determined by the phase relationship (in phase or 180° out of phase) between a reference voltage applied through winding 13 from square wave generator 10 and the aforementioned signal voltage. When the reference voltage from winding 13 is at the half-cycle, and point 32 in bridge D is positive with respect to point 33, diodes D1 and D2 are biased in a forward direction, offering least resistance; diodes D3 and D4 are cut off and can be considered as open circuits. In the next half cycle of the reference voltage, diodes D3 and D4 conduct and diodes D1 and D2 are cut off.

If the signal voltage applied to bridge D from winding 14 is other than zero, current will be caused to flow in meter M1 in response to this applied signal voltage. The direction of this current is determined by whether point 31 (diodes D1 and D2 conducting) or point 30 (diodes D3 and D4 conducting) is positive or negative with respect to center tap terminal CT$^1$. Stated differently, the direction of the current is dependent on the phase relationship of signal voltage applied at winding 14 and the reference voltage applied at winding 13.

As the reference voltage changes polarity, the signal voltage also will change polarity. Assuming these two voltages are in phase, it is seen that the meter current through M1 flows in a fixed direction, thus diodes D1 through D4 fulfill the role as a detector. The fact that the meter current direction is determined by the phase relationship between the two voltages applied makes this circuit phase sensitive. It will be appreciated that the demodulator D operates only when the reference voltage and the signal voltage are of the same frequency, and hence this circuit may be said to be synchronous.

Normally and with the switches shown as they are in the drawing, current will flow through the meter in the direction indicated by the solid arrow when the voltages induced in windings 13 and 14 are in phase and will flow in the direction indicated by the dash arrow, when the voltages induced in said windings are 180° out of phase with respect to each other.

Having described the various elements of the strain gage instrument of FIGURE 2, the operation thereof may be best understood by assuming for the moment that bridge W is completely balanced, and therefore no voltage should be detected across the terminals A and A$^1$. As noted previously, an output terminal A of bridge W is connected to amplifier 17 via potentiometer 20, while the other terminal A$^1$ from the bridge is connected directly to amplifier 17 so that the voltage appearing across the two terminals A and A$^1$ may be impressed upon the input terminals of amplifier 17. In the balanced bridge condition, the variable arm 20a of potentiometer 20 is placed at the ground reference point 34 and hence amplifier 17 will not produce an output. In turn, amplifier 16 will not generate an output through primary winding 15, and thus the meter M1 connected between terminals CT and CT$^1$ of demodulation bridge D will not be actuated.

If the resistive transducer element R2 of the bridge W changes its resistance, it will be appreciated that an output will be developed across terminals A and A$^1$. With the arm 20a at point 34, the full output of the bridge (i.e. the potential difference between points A and A$^1$) is applied to the electrodes of amplifier 17, which in response thereto produces an output. This output is transmitted to demodulator D via amplifier 16 and transformer 41, and accordingly meter M1 gives an indication of the magnitude of the signal. If now, arm 20a is moved away from point 34, then the potential difference applied to the electrodes of amplifier 17 may be changed, and in particular reduced to zero if the A.C. voltage applied to windings 12 and the A.C. output of the bridge W are 180° out of phase. The amount that arm 20a is moved so as to apply a voltage equal to that appearing at terminals A and A$^1$ is a measure of the strain applied to strain sensitive element R2, and a scale (not shown) attached to the arm would indicate this strain to the user of the instrument. It will be appreciated that under ideal conditions, the voltage appearing across potentiometer 20 and the output terminals of bridge W should be exactly 180° out of phase since both are driven from a common source 10. However, in actuality this will not be the case. As previously explained, bridge W is not purely resistive and comprises additional capacitance associated with elements R1 through R4 and their connecting leads.

If bridge W, as well as the other elements shown in FIGURE 2, were driven from a conventional sine wave generator as in the prior art, then the output of the bridge W created across terminals A–A$^1$ will not be in exact phase to the voltage appearing across the potentiometer 20. FIGURE 2A illustrates typical wave forms to be expected if the apparatus of FIGURE 2 were driven by a sine wave generator. The wave form marked "output" illustrates the voltage at terminals A–A$^1$; and the wave form marked "comparison" is the voltage picked off by arm 20a of potentiometer 20 to oppose the output of the bridge, and hence remove the drive to amplifiers 17 and 16, and demodulator D. If the bridge of FIGURE 2 is energized from a conventional sine wave generator (see wave form at 2A–1) as in the prior art and if this bridge is unbalanced both resistively and capacitively, then the output of the bridge W created across terminals A–A$^1$ (wave form 2A–2) will be somewhat out of phase with the voltage appearing across the winding 12 which drives the potentiometer 20. If this output voltage is broken down into two components, the first one we will call the signal component which represents the amount of resistive unbalance contained in the bridge W. This voltage will be either in phase or 180° out of phase with the comparison voltage. The second component designated is the quadrature or residual (wave form 2A–3) component which is caused by the capacitive unbalance in the bridge W. The quadrature component will be 90° out of phase with the comparison voltage. Fortunately, the quadrature component is not detected by the ring demodulator. This is the reason that in a conventional instrument using sine waves, small amounts of capacitive unbalance in the bridge W will not cause an error in the reading. It is only when this quadrature component is large that trouble arises. The point of interest then is when the signal component of bridge W equals the potential between the arm 20a and the reference of potentiometer 20. At this point, the meter M1 indicates 0. Nevertheless, amplifier 17 would amplify the quadrature component. If this quadrature component is large enough to cause saturation of the amplifier 17, then the amplifier will cease to be sensitive or will become less sensitive to any signal component applied.

FIGURE 2B illustrates the wave forms which can be expected when the apparatus of FIGURE 2 is driven by a square wave generator 10. The first two wave forms (2B-1 and 2B-2) of FIGURE 2B show the output of bridge W, and the wave form of the voltage picked off by arm 20a of potentiometer 20 which is used to oppose the output from the bridge. It appears from FIGURE 2 that the first (wave form 2B-1) and second wave form (2B-2) are substantially the same except that they are 180° out of phase and the output waveform (2B-2) has a spike at its leading and lagging edges. This spike is due to the capacitance CD inherent in the bridge circuit W. The residual voltage (waveform 2B-3) produced even after the potentiometer 20 voltage is matched with the output of bridge W is shown in the third line of FIGURE 2B. There it may be observed that when a square wave driver is used, the capacitive unbalance in the bridge manifests itself as a spike at the switchover points of the square wave. These spikes are small in duration, although the amplitude can be comparatively large with peak supply voltage as its upper limit. The in-phase unbalance on the other hand takes the form of a square wave, the amplitude of which is easily calculable.

The amplifiers used in the strain gage instrument will of course be saturated, but, however, for only a short time, i.e. for the duration of the spikes. The significant portion of the signal (between spikes) is well behaved and is readily amplified without distortion. Thus, effectively, the signal component has been effectively separated from the residual component and amplification of the signal portion of the wave form may be had without fear of saturating the amplifier by the spike voltage. However, it will be readily observed and appreciated from the foregoing text material, in the case of sine wave drive, the separation of the residual components due to the capacitive unbalance and any voltage legitimately driving the amplifiers will ordinarily be impossible.

The ganged switches 22, 23, 24 and 25 shown connected to potentiometer 18 and meter M1 allow the operator of this device to control the phase of the voltage applied to elements 19 and 20 from generator 10 with respect to the phase of the voltage produced across terminals A and A¹ of bridge W. It will be understood that the output of bridge W may be in phase or 180° out of phase with the voltage developed across elements 19 and 20 in response to the reference potential from generator 10. This phase relationship depends upon whether the value of resistor R2 increases or decreases in response to tension or compression, respectively. For general operation of the over-all strain gage indicator, it will be necessary at times to reverse the reference voltage phase. When R2, the strain sensitive element, is subjected to compression rather than tension as described heretofore, the comparison and output voltages will be in phase, hence it would be impossible to balance out the output of the bridge W by moving arm 20a of the potentiometer 20. In order to make this instrument useable under this set of circumstances, the switches 22, 23, 24 and 25 are used to reverse the phase of the voltage applied to potentiometer 20 and to reverse the polarity of meter M1. The latter is purely an operational convenience.

Figure 3:
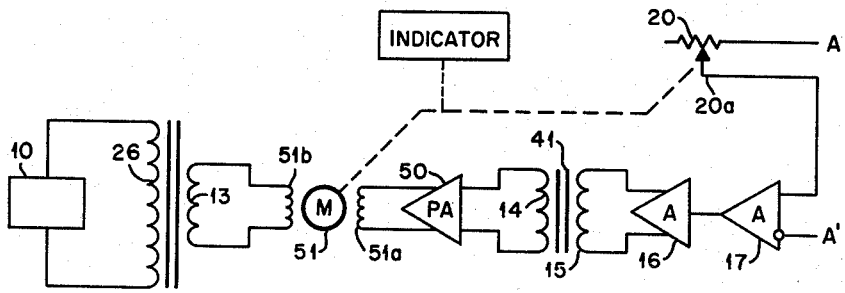
FIGURE 3 illustrates one modification of the apparatus FIGURE 2.

Referring now to FIGURE 3, there is shown a modification of the device of FIGURE 2. Elements of FIGURE 3 which have the same function as corresponding elements of FIGURE 2 bear identical reference numbers and will not be again described. It will be observed from this figure that signal fluctuations produced by bridge W are coupled through amplifier 17 and 16 through primary winding 15 of transformer 41, in the same manner as previously described. Primary winding 15 of transformer 41 now is coupled to secondary winding 14 which in turn transmits the signal generated in response to a change in the value of resistor R2 (FIGURE 2) to the input of power amplifier 50. The output of power amplifier 50 is coupled to one winding of motor assembly 51, and the reference voltage source, i.e. square wave generator 10 is transformer coupled via windings 26 and 13 to another of the windings of the motor assembly 51. The rotor of motor 51 is mechanically linked to the moveable arm 20a of potentiometer 20. Motor assembly 51 is meant to depict a two phase servo motor system of the type well known in the electronic art. This servo motor system will not be described in detail; however, it is well known that the rotor thereof will rotate if the signal voltage (from bridge W) and the reference voltage (from generator 10) are 90° out of phase. The direction of rotation depends on whether the signal voltage leads or lags the reference voltage. Further, it will be noted that the rotor of the servo motor will not move at all in the absence of a signal voltage (i.e. a signal from bridge W via elements 17, 16, 41 and 50).

In operation, when the bridge W is balanced, it will be understood that amplifier 50 will not produce an output, and hence the rotor of motor 51 will remain stationary. However, when an output is produced between terminal A and A¹ of bridge W, current will flow in both windings of motor assembly 51, and hence the rotor thereof would turn. The direction of rotation of the rotor of motor 51 will depend upon the phase relationship of the signal and reference voltages as previously explained. That is, if the signal and reference voltages are in one phase relation, the motor 51 will move arm 20a of potentiometer 20 in one direction, and if these currents are of the opposite phase relation, motor 51 will move arm 20a in the opposite direction. Consequently, it will be appreciated that through suitable mechanical linkage, the motor 51 when actuated by an output from bridge W via elements 17, 16, and 50, drives the potentiometer arm 20a in either of two directions. When arm 20a is moved to a position, such that the voltage it picks off potentiometer 20 cancels the drive from bridge W, the motor 51 will stop. An indicator (not shown) connected to arm 20a will then yield the value of the amount of compression or tension on the strain sensitive element R2 of bridge W.

Although it has not been expressly shown in the accompanying drawings, it is within the scope of this invention that the motor 51 control via suitable linkage, an external device (e.g. a switch, a relay, etc.) in response to changes in the output voltages from bridge W (FIG. 2).

Having thus described my invention, I claim:

1. Apparatus for measuring changes in a resistive transducer comprising a Wheatstone bridge having four legs, one of which includes said resistive transducer and the others of which include impedances, said bridge further including a pair of input terminals and a pair of output terminals, means for applying an alternating square wave signal to the input terminals of said bridge, means producing a alternating square wave reference voltage which is in phase with said square wave signal applied to said input terminals, an amplifier having input and output terminals, means connecting the output terminals of said bridge to the input terminals of said amplifier, means for connecting said reference voltage to said amplifier and in series bucking relationship with the output voltage from said bridge, means for varying the magnitude and reversing the phase of said reference voltage, a phase sensitive detector connected to the output of said amplifier and a null indicator connected to said detector, said reference voltage varying means being adjustable to vary said reference voltage and produce a null indication on said indicator, the last said means in an adjusted position providing an indication of the change in magnitude of the resistance of said transducer.

2. Apparatus for measuring changes in a resistive transducer according to claim 1 wherein said transducer is a strain gage located at a distance from the bridge and connected to said bridge by lead wires having appreciable capacitance therebetween.

3. Apparatus for measuring changes in a resistive transducer comprising a Wheatstone bridge having four legs, one of which includes said resistive transducer and the others of which include impedances, said bridge further including a pair of input terminals and a pair of output terminals, means for applying an alternating square wave voltage to the input terminals of said bridge, means for producing an alternating square wave reference voltage which is in phase with the first said square wave voltage, an amplifier having input and output terminals, means connecting the output terminals of said bridge to the input terminals of said amplifier, means connecting said reference voltage in series bucking relationship with the output voltage from said bridge, means for varying the magnitude and reversing the phase of said reference voltage, an individual square wave source voltage having a frequency equal to the reference voltage frequency, a phase sensitive demodulator connected to the output of said amplifier and said source voltage and null indicating means connected with said phase sensitive demodulator, said reference voltage varying means being adjustable to vary said reference voltage and produce a null indication on said indicator, the last said means in an adjusted position providing an indication of the change in magnitude of the resistance of said transducer.

4. Apparatus according to claim 3 including phase reversal means interconnected with said reference voltage and said indicating means.

5. Apparatus according to claim 3 wherein said phase sensitive demodulator comprises a ring demodulator, a transformer having a primary winding connected to said amplifier and a centertapped secondary winding, connections between said secondary winding and two terminals of said ring demodulator, and a centertapped source of alternating square wave energy connected to a second pair of demodulator terminals, the last said source having a centertap, said null indicating means being connected to the centertap of said secondary winding and to the centertap of the last said square wave source.

6. Apparatus for measuring resistance changes in a resistive transducer comprising a bridge having four series connected legs and input and output terminals, one of said legs comprising said tranducer, means for applying an alternating square wave voltage to said input terminals of said bridge, a reference source of alternating square wave voltage including means for varying the magnitude thereof, means connecting one side of the last said source to one output terminal of said bridge to produce a resultant difference voltage between the other side of the last said source and the other output terminal of said bridge, means for amplifying said resultant voltage, a servomotor connected with the output of said amplifier and mechanically coupled to said reference voltage magnitude varying means, said servomotor being operable in response to signals produced by said amplifier and in turn operating said reference voltage magnitude varying means to exactly balance said bridge voltage and means for indicating the magnitude of said reference voltage.

References Cited by the Examiner
UNITED STATES PATENTS

| | | | |
|---|---|---|---|
| 2,611,811 | 9/52 | Yates | 324—57 |
| 2,706,799 | 4/55 | Howe et al. | 73—88.5 |
| 3,039,050 | 6/62 | Krohn | 324—75 |

OTHER REFERENCES

Technical Publication, entitled, "A Square Wave Inductance Bridge," by K. Lamont, pages 357–359 of Electronic Engineering, August, 1955.

Technical Publication, entitled, "New Bridge Technique," by Thomas Roddan, pages 8–10 of Wireless World, January 1950.

WALTER L. CARLSON, *Primary Examiner.*

C. A. CUTTING, *Examiner.*